United States Patent
Frielinghaus

[15] 3,707,717
[45] Dec. 26, 1972

[54] BOAT BERTHING MONITOR INCORPORATING SONAR AND DOPPLER RADAR TECHNIQUES

[72] Inventor: Klaus H. Frielinghaus, Rochester, N.Y.

[73] Assignee: General Signal Corporation, Rochester, N.Y.

[22] Filed: June 25, 1971

[21] Appl. No.: 156,678

[52] U.S. Cl..................343/6 R, 343/7 ED, 343/9
[51] Int. Cl. ...........................G01s 9/02, C01s 9/68
[58] Field of Search.......................343/6 R, 7 ED, 9

[56] References Cited

UNITED STATES PATENTS 3,139,617   6/1964   Denman et al.....................343/6 R
3,183,478   5/1965   Slawsky et al. ....................343/6 R

*Primary Examiner*—Benjamin A. Borchelt
*Assistant Examiner*—Robert Kinberg
*Attorney*—Harold S. Wunn et al.

[57] ABSTRACT

A system has been provided for generating correction command signals relative to the berthing velocity profile of a vehicle in approach of a docking position. A doppler radar system including a radar transceiver projects signals between the docking position and the vehicle and respondingly generates doppler shift frequency signals indicative of the velocity of the vehicle and the relative displacement thereof. A radar counter having preset initial counts stored therein indicative of anticipated initial berthing conditions, responds to the frequency shift signals by counting down from the initial counts in accordance with the doppler shift. Means is included for updating the radar counter in accordance with actual conditions and includes a sonic detector which periodically projects sonic signals between the vehicle and the docking position and respondingly generates corrected count signals in accordance with the reflected sonic energy, indicative of actual distance of the vehicle to the docking position. Means is utilized which periodically transfers the corrected count signals to the radar counter, correcting for errors between actual nd preset initial conditions.

A velocity profile generator responds to the radar counter output and generates a programmed desired berthing velocity profile which a comparator responds to the velocity profile generator and the counter for generating command signals indicative of any discrepancy between the actual and desired vehicle berthing profile.

8 Claims, 9 Drawing Figures

BOAT BERTHING MONITOR INCORPORATING SONAR AND DOPPLER RADAR TECHNIQUES

BACKGROUND OF INVENTION

It is not humanly possible for all ship pilots to consistently sense correctly the varying ship-to-dock distances and approach velocities that pertain in the course of berthing large ships. Miscalculation, resulting in too high ship-to-dock impacts, can damage the dock, the ship, or both. The larger the ships, the more extensive this damage can be, particularly when the ship's tonnage far exceeds that for which the dock facilities were designed. Too, the longer the ship, the more difficult it is to observe and then maintain uniform distances and velocities between each, the ship's bow and stern and the dock.

It is an object of the present invention to provide an arrangement which substantially obviates one or more of the limitations and disadvantages of prior docking arrangements.

It is another object of the present invention to provide an automatic lock-on of vehicle and berthing position.

It is yet another object of the present invention to provide a safe system for docking, particularly cumbersome vehicles.

It is yet another object of the berthing velocity monitor control system described herein to sense, automatically, and continuously, the ship-to-dock distance and the ship's approach velocity and then cause signal aspects as will enable the pilot to better direct the berthing operation and thereby avoid mishaps.

SUMMARY OF INVENTION

A system has been provided for generating correction command signals relative to the berthing velocity profile of a vehicle in approach of a docking position. A doppler radar system including a radar transceiver projects signals between the docking position and the vehicle and respondingly generates doppler shift frequency signals indicative of the velocity of the vehicle and the relative displacement thereof. A radar counter having preset initial counts stored therein indicative of anticipated initial berthing conditions, responds to the frequency shift signals by counting down from the initial counts in accordance with the doppler shift. Means is included for updating the radar counter in accordance with actual conditions and includes a sonic detector which periodically projects sonic signals between the vehicle and the docking position and respondingly generates corrected count signals in accordance with the reflected sonic energy, indicative of actual distance of the vehicle to the docking position. Means is utilized which periodically transfers the corrected count signals to the radar counter, correcting for errors between actual and preset initial conditions. A velocity profile generates a programmed desired berthing velocity profile. A comparator responds to the velocity profile generator and the counter for generating command signals indicative of any discrepancy between the actual and desired velocity berthing profile.

For a better understanding of the present invention, together with other and further objects thereof, reference is had to the following description, taken in connection with the accompanying drawings, while its scope will be pointed out in the appended claims.

DESCRIPTION OF THE PREFERRED EMBODIMENT

In examining the velocity vs. distance relationships of tankers, it becomes apparent that safe berthings can be accomplished in minimum time if the tanker's approach-to-dock velocity is relatively high, say 35 to 50 feet per minute, when they are beginning the berthing cycle at a point 250 or so feet distant from the dock, and then, from this point on in, the velocity is slowly reduced to about one-half its original level when the tanker is approximately 50 feet from the dock. From this point on, the velocity should decrease at an increasing rate until when the tanker is 12 or so feet from the dock the velocity is not in excess of that at which it is allowable for the tanker to contact the dock.

Figure 1:
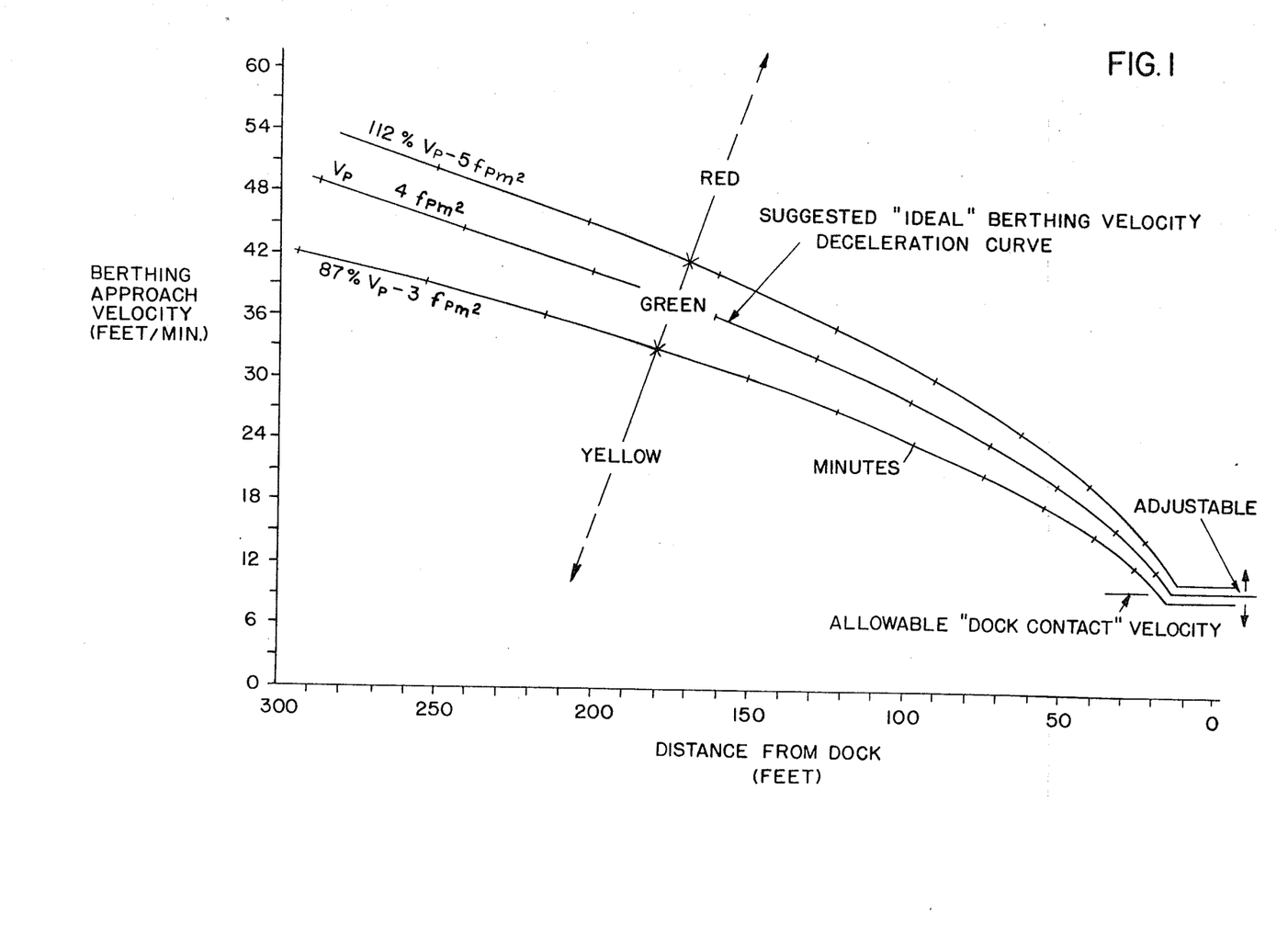
FIG. 1 shows a docking velocity profile for a vehicle such as an oil tanker.

A smooth curve version of such a docking velocity profile is shown in FIG. 1. From this, it appears that the curve representing a constant deceleration of approximately 4 $Fpm^2$ would be an ideal berthing velocity curve with the curves of 3 and 5 $Fpm^2$ constant deceleration representing ideal lower and upper limits. The curves are such that at greater distances from the dock, reasonably large tolerances are permitted by the lower and upper limit curves but as the distance from the dock decreases, much less deviation from the ideal is allowed. A useful berthing velocity monitor/control system would be one that would automatically sense the velocity of both the bow and the stern of the approaching tanker and the distance each is from the dock, and then, by relating the velocity and distance values, provide the pilot with readily comprehendable visual signals that would enable him to control the velocity of the tanker in manner that it would follow the desired deceleration curve.

Figure 2:
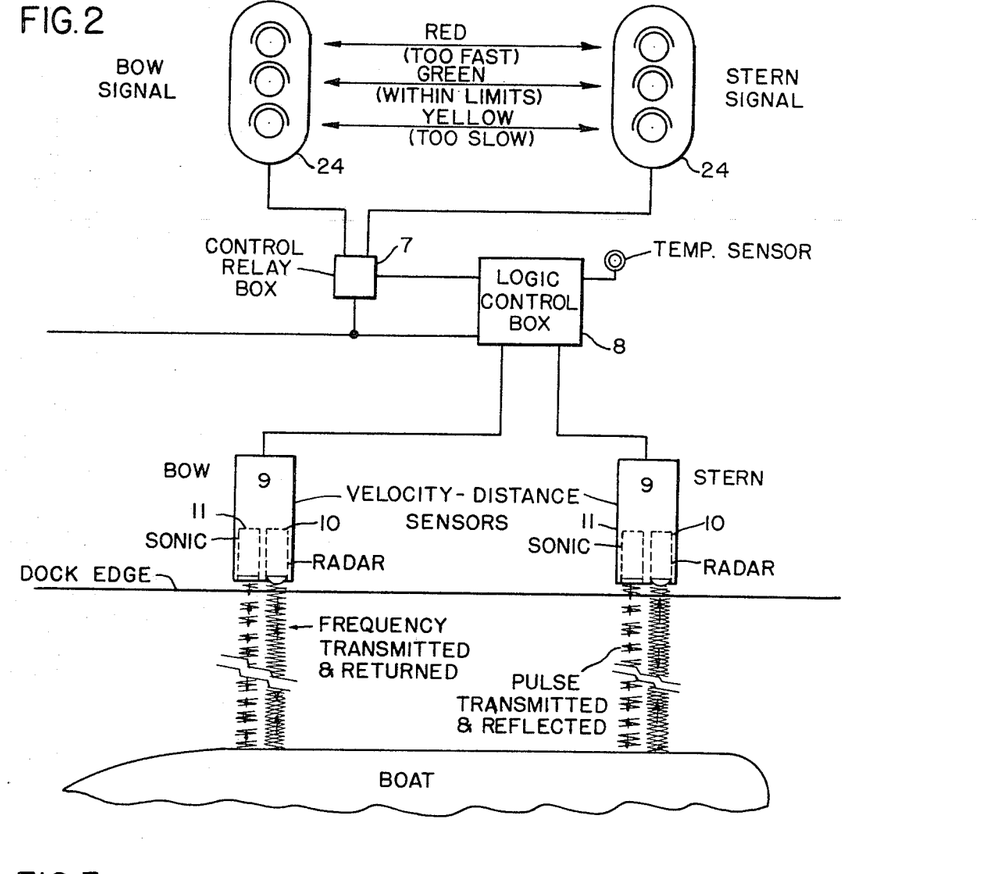
FIG. 2 is a block diagram illustrating the general concept of the invention.

FIG. 2 shows, in block form, the organization of a system that would accomplish the foregoing. Velocity distance sensors 9 are located on a dock at a selected distance, from each other, and a height comparable to the average height of tankers to be serviced. Each sensor 9 includes a radar unit 10 and sonic unit 11. The radar unit detects speed and relative displacement of the tanker and transmits such information to the logic control box 8 which controls relay box 7. The relay contacts actuate various aspects of signal heads 24 which the pilot of the tanker observes and initiates commands for correcting ship's motion towards the dock. The relay box 7 may also control side thrusters for the ship and provide automatic berthing.

Figure 3:
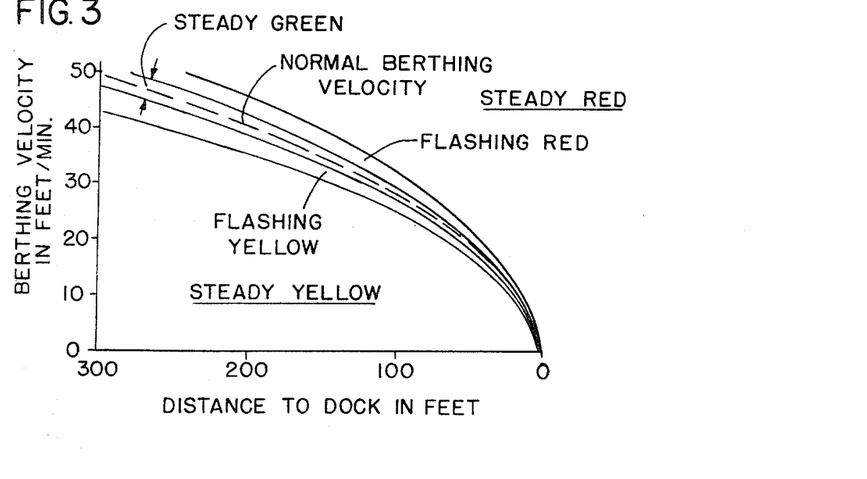
FIG. 3 is another profile curve showing speed and distance ranges for various signal aspects.
Figure 4A:
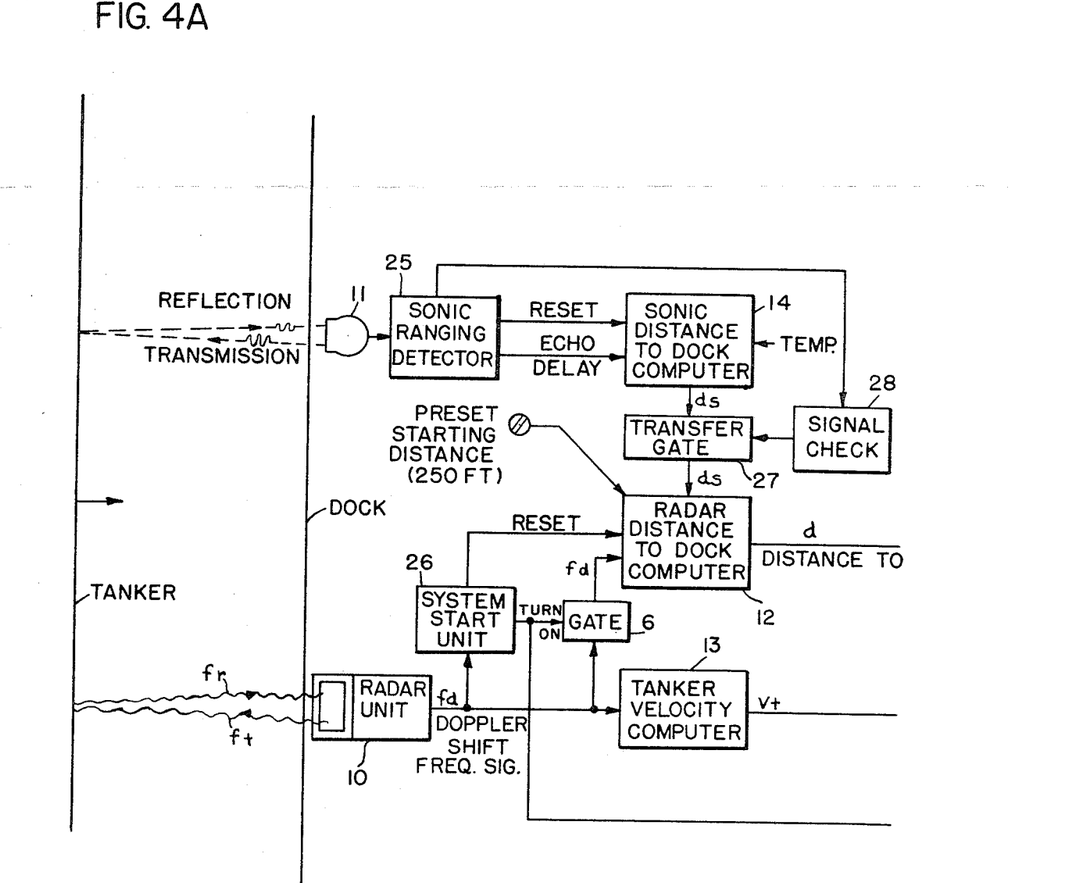
FIGS. 4A–4B taken together show in simplified block form a detail of one of the monitoring units used in the practice of the invention.
Figure 4B:
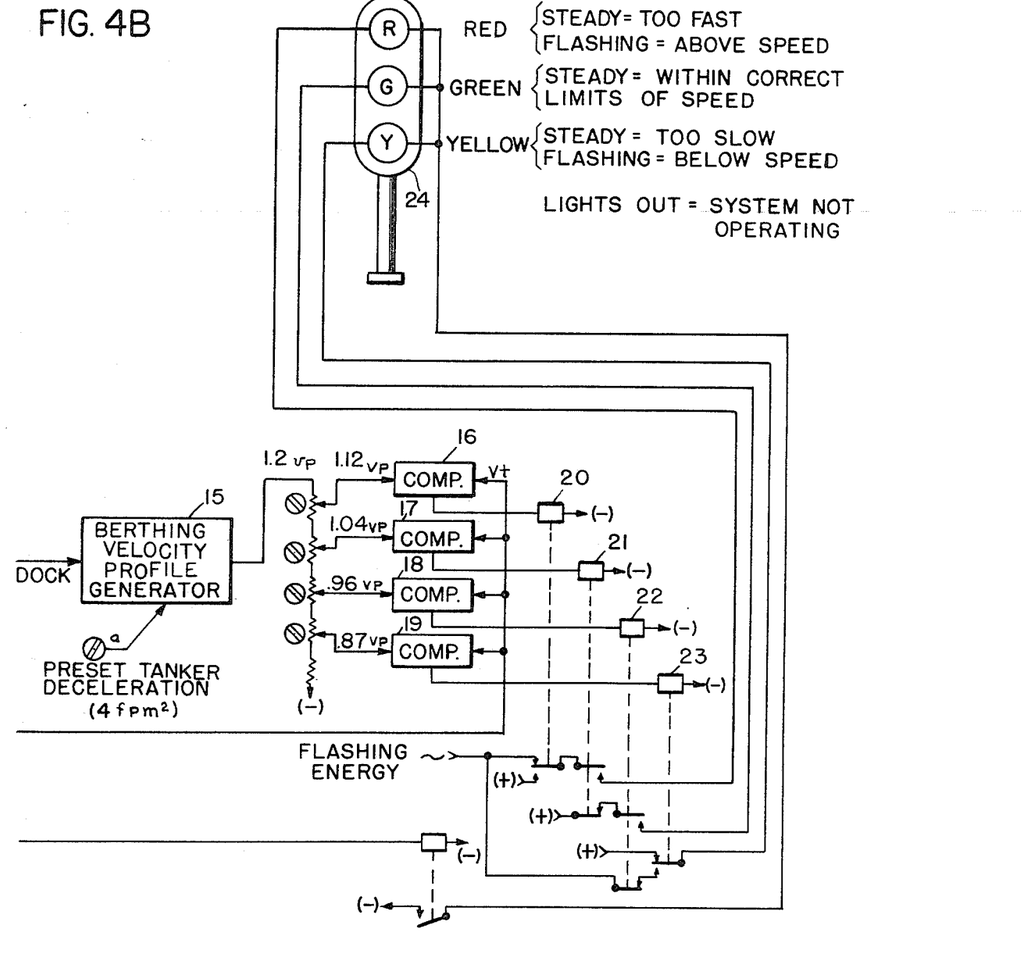

FIG. 3 shows the manner of correction signal proposed; the aspects they would display, how they relate to the tanker's bow and stern velocities and what they would indicate to the pilot. The equipment shown in FIGS. 4A–4B is that required for each the bow and the stern monitor/control systems. Where possible, the two systems' equipment are housed in common housings, as shown in FIG. 2.

The major elements comprising the system are the Doppler Radar Unit 10 for sensing the velocities, the Ultrasonic Presence Detector 11 for sensing the distances, radar signal controlled Velocity and Distance-to-Dock 13 and 12 Distance!-to-Dock computer 14, Berthing Velocity Profile bordering the chosen ideal deceleration curve of FIG. 3. The respective Relays 20–23 control the signal head 24 aspects.

The system start unit 26 responds to a range of radar signals for resetting the radar distance to dock computer 12. Gate 6 conducts doppler radar counts to the computer 12 for initiating computation of relative displacement of the tanker. The velocity computer 13 generates an output indication with vehicle speed and the signals are compared with outputs from the velocity profile generator controlled by the distance to dock computer 12. Actual or absolute distance to dock is determined by sonic transducer 11 which transmits sonic pulses for reflection from the tanker and respondingly generates an output to the sonic distance to dock computer 14. Transfer gate 27 updates the radar distance to dock computer 12 storage, correcting for initial condition errors by transferring counts, i.e., corrected count signals, indicative of absolute vehicle distance to computer 12. Signal check 28 governs the transfer gate 27 to assure only correct distance counts are transferred.

Let it be assumed that the tanker berthing cycle begins at a nominal point in distance from the dock, say 250 feet. The system's radar units would by now have sensed the presence of the tanker. Since the tanker is at this time beyond the range of the ultrasonic detectors 11, the distance basis used at this time and until the tanker comes within range of the ultrasonic detectors is provided by the radar distance-to-dock computers 12. For most docks, it is suggested that this computer "initial distance" could be preset at 250 feet. As the tanker approaches the dock, the radars' doppler shift input to the computers 12 would represent distance traveled by the tanker's bow or stern and would be subtracted from the preset 250 feet. The then computed values would represent the distance from the dock plus or minus the difference of where the tanker actually started breasting in in comparison to the preset 250 feet.

Those distance-to-dock signals are then fed to the Berthing Velocity Profile Generator 15 which would have preset ideal berthing deceleration rates.

The output of the Velocity Profile Generator 15 is the desired instantaneous velocity represented by the computed point in distance where it intersects the ideal berthing velocity deceleration curve. The resulting velocity value is then fed to the Comparators 16–19 where it is compared to the actual instantaneous tanker velocity value supplied by the Tanker Velocity Computer 13. The output from the Comparators 16–19 control the operation of the respective signal aspect control relays 20–23 to cause the appropriate correction signal aspect to be displayed.

If, for example, the instantaneous computed distance was 200 feet, and the actual tanker velocity was measured as between 35 and 45 feet per minute, the GREEN aspect would be displayed, indicating that the speed of approach was within correct limits.

Observance of these indications, and taking appropriate action with regard to decreasing or increasing the tanker's bow and stern velocities, will enable optimum docking velocity and tanker to dock alignment to be obtained.

When the tanker arrives at a distance of 140 feet or less from the dock, it is within range of the Ultrasonic Detectors. From this point on in the control of the velocity continually becomes more critical, the Ultrasonic Detectors 11 in combination with the sonic ranging detector 25 produce sonic ranging signals. These signals are input to the Sonic Distance-to-Dock Computers 14 and result in outputs from there to the radar Distance-to-Dock Computer 12. This corrects the Distance-to-Dock Computers 12 output feeding to the Berthing Velocity Profile Generators 15, to the actual tanker-to-dock distance then existing. From then until the tanker touches the dock, the sonic computed distances will govern the Distance-to-Dock values fed to the Berthing Velocity Profile Generators 15 and so enable the Comparators 16–19 to properly control the signal aspect control relays 20–23.

Once the tanker has been docked, and hence not moving, the output of the Radar Units ceases. This is recognized by the System Start Unit 26 which turn off the signal aspect displays 24 and reset the system for the start of the next tanker berthing cycle.

Should a Radar Unit 10 fail during the course of berthing, the associated signal would go dark, after a short time interval, indicating to the Pilot that he must manually observe and control the berthing operation, as is presently accomplished.

Regarding the locations of the Velocity Distance Sensors 9, it would be benefit if they could be mounted at a level not above the deck level of a loader tanker and at points laterally that would be opposite the bow and stern portions of the average tanker as it approaches the dock.

The operational parameters suggested by the curves shown on FIG. 1 may be varied higher or lower, and/or with more or less tolerance spread, as may be determined desirable. Effort has been made to develop a "standard" system which can be adapted to any location by means of the adjustments provided for presetting the "starting distance", the "tanker deceleration", the Comparator adjustments, and the "allowable dock contact velocity". These preset settings would be dictated by the physical docking conditions at a particular dock. Once they are properly set during the initial installation, they would not normally require further attention.

Figure 5A:
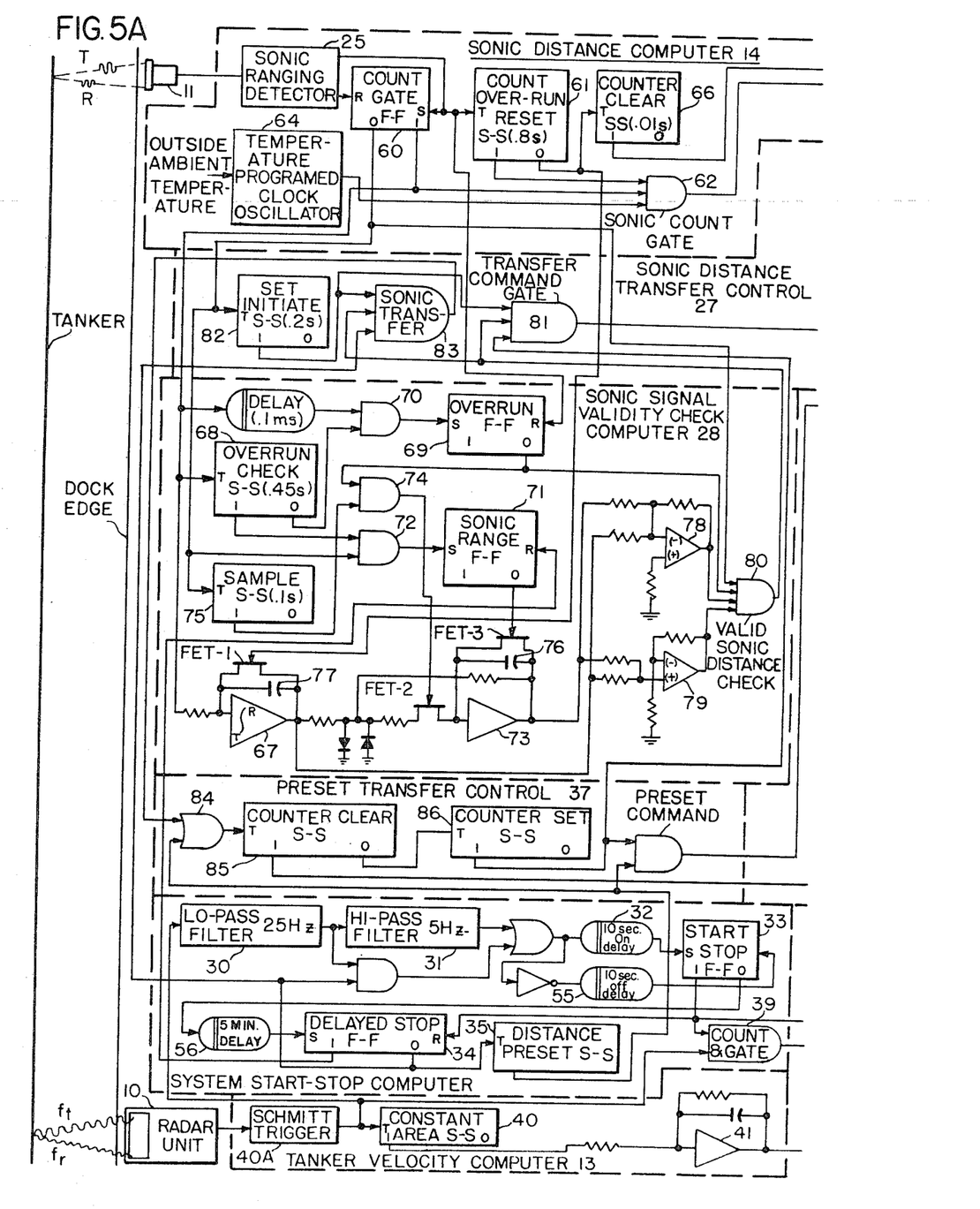
FIGS. 5A–5B taken together show details of FIGS. 4A–4B.
Figure 5B:
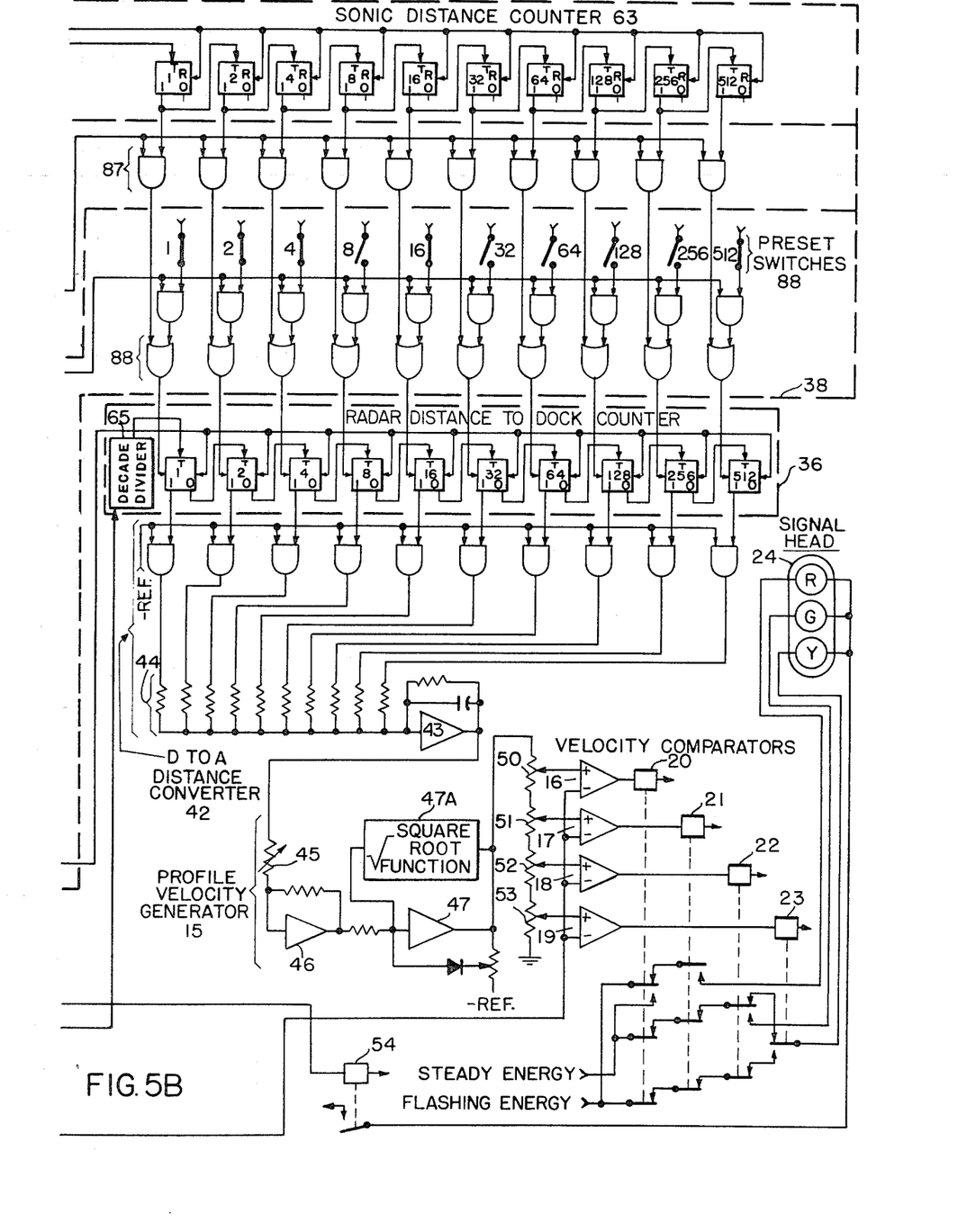
Figure 6A:
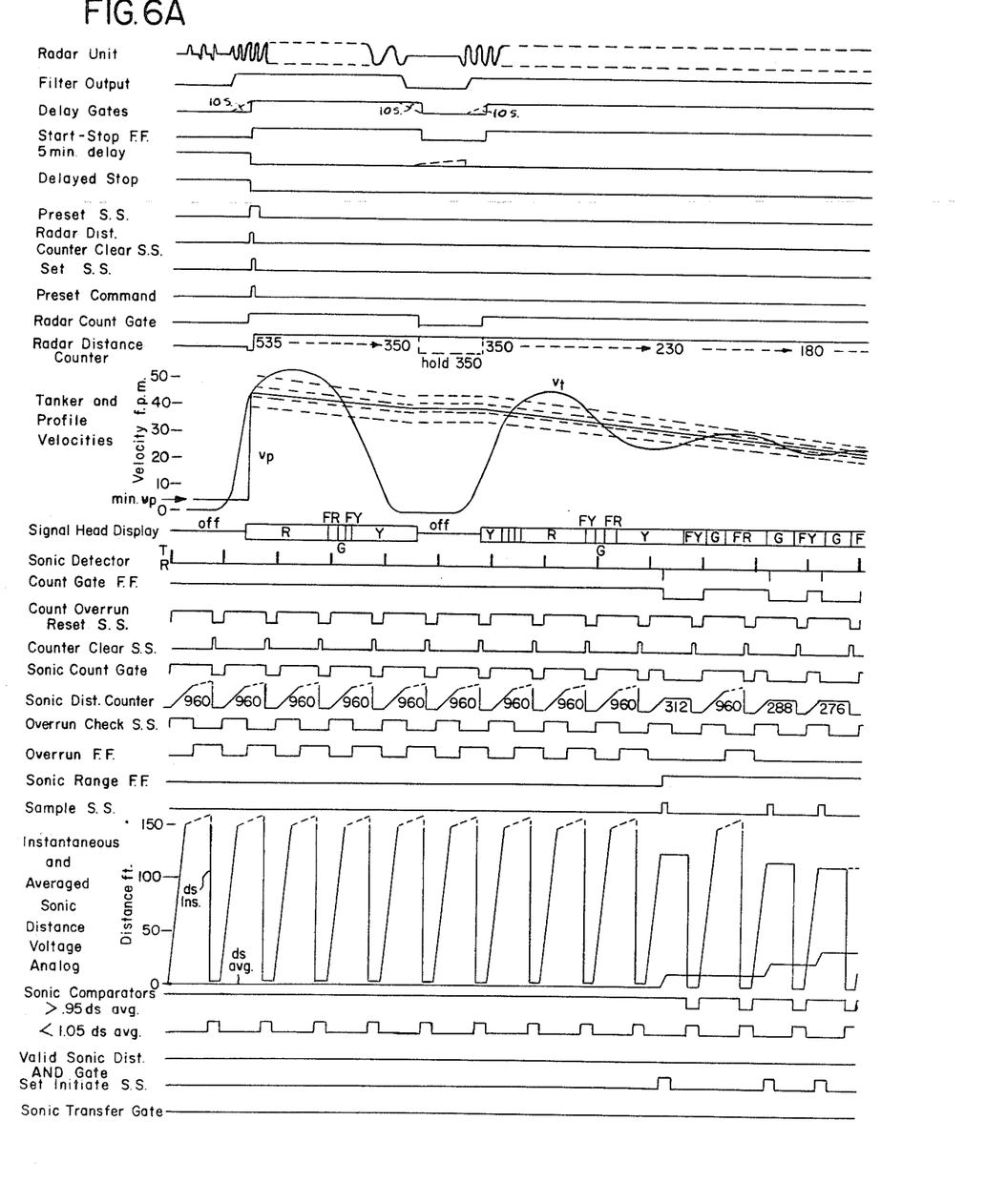
FIGS. 6A–6B is a wave form diagram illustrating the operation of the circuits shown in FIGS. 5A–5B.
Figure 6B:
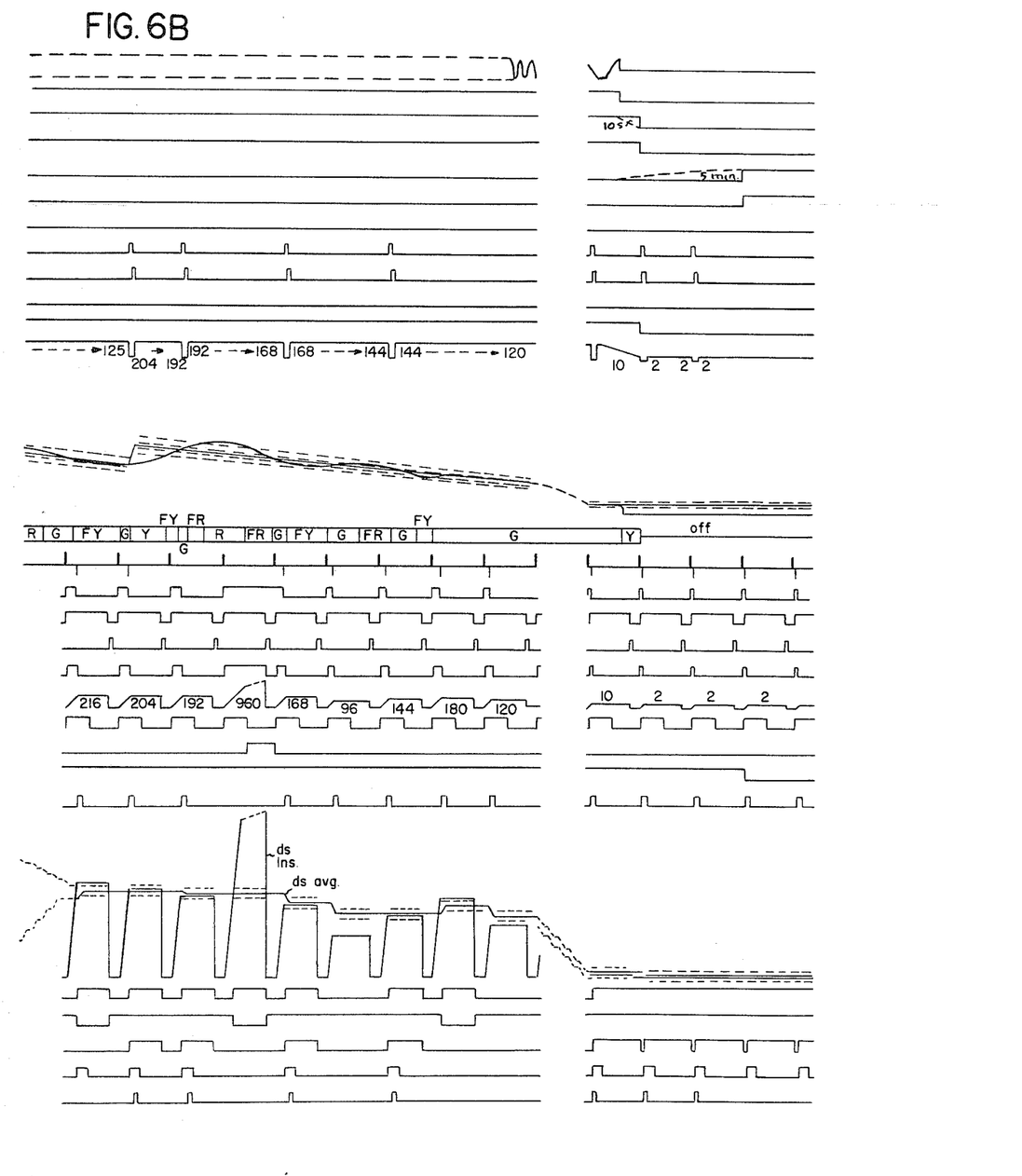

FIGS. 5A–5B illustrate a detailed logic diagram of the Tanker Berthing Velocity Monitor/Control System. FIG. 6 illustrates a sequence chart of the logic operation of this control system.

Since this control system is completely automatic in its system start-up at the approach of a berthing tanker and shut down and reset at the completion of a tanker docking, the Radar Unit 10 of FIG. 4A is used as the system start and reset sensor. It is a doppler radar which is sensitive only to moving objects primarily sensing the velocity of targets by producing an output frequency which is proportional to the velocity of the target. It can also produce information as to the distance moved by the target since each cycle of output signal represents one-half a wavelength of movement of the target. Since the particular doppler radar unit used operates at a frequency of 10.525 Gigahertz, it generates an output of 0.3565 cycles per second for each foot per minute of velocity of the target. Also for each cycle of output signal, the target has moved 0.04675 feet. The docking procedure of tankers proceeds in the following manner. The tanker approaches the dock by moving parallel to the dock, some 300 feet out from the dock. Once the tanker is parallel to the dock and is positioned longitudinally to its final mooring point on the dock, the tanker is pushed broadside to the dock by tug boats, starting at about 250 to 300 feet out from the dock. This is called the berthing operation and is directed by the pilot from the bridge of the ship through walkie-talkie communications with the tug boat captains. When the berthing operation starts, the tanker is pushed broadside to the dock at velocities up to about 50 feet per minute. As the tanker approaches the dock face, this berthing velocity is gradually reduced and is about 3 to 4 feet per minute when the tanker makes contact with the dock face. At this point, the ship is tied fast to the dock. The doppler radar unit 10 can be used as a system starting sensor since there is a definite change in character in its output signal at the time the tanker gets into parallel position to the dock and actually starts breasting in parallel to the dock. At the time the tanker is getting in parallel position to the dock, it is generally moving perpendicular to the radar beam with almost no component of velocity which is in line with the radar beam. As a result there is no output from the Radar Unit 10 other than some high and very low frequency noise. Once the tanker is in a parallel position to the dock and it is beginning to breast in broadside, a strong, steady signal output in the frequency range of 5 to 25 cycles per second, depending on the berthing velocity of the tanker, is present at the output of the Radar Unit 10. From the block diagram of FIGS. 5A–5B, note this signal is selected by passing first through a 25 Hz Low Pass Filter 30 and then through a 5 Hz High Pass Filter 31. If this 5 to 25 Hz signal persists for at least 10 seconds, as determined by delay unit 32, the Start-Stop Flip-Flop 33 will be set. This in turn resets the Delayed Stop flip-flop 34 which in turn triggers the Preset Single Shot 35. The operation of the Preset Single Shot 35 initiates a distance preset operation by first clearing the Radar Distance to Dock Counter 36 through Preset Transfer Control 37 and then setting in, the preset starting distance, as set up by the Preset Distance Switches 38 (approximately 250 feet). The setting of the Start-Stop Flip-Flop 33 also opens the count AND gate 39 thus permitting the radar signal to down count the Radar Distance to Dock Counter 36 depending on the movement of the tanker. Note that the radar signal is divided by 10 at 65 before it passes to the Distance to Dock Counter 36 so that each count now in the Distance to Dock Counter 36 represents 0.4675 feet of movement toward the dock by the tanker. Notice that once the control system has acquired the tanker (the Start-Stop Flip-Flop 33 is set) the reset state of the Delayed Stop Flip-Flop 34 allows the radar output to bypass the 5 Hz High Pass Filter 31 in maintaining the Start-Stop Flip-Flop 33 in its set state. This permits the system to remain actively operating right down to almost zero tanker velocity once the system has recognized that the berthing operation has started.

The actual tanker berthing velocity is converted into a D.C. voltage, $v_t$, by passing the radar 10 output frequency signal through the tanker velocity computer 13 including, a Schmitt trigger 40A and a single shot circuit 40 which generates constant width and constant height pulses (constant area pulses) for each cycle of the frequency signal. These constant area pulses are then averaged in the averaging circuit 41 which results in a D.C. analog of the actual tanker berthing velocity.

The ideal berthing velocity curve is generated in the Velocity Profile Generator 15 and its output is the desired profile velocity, $v_p$. The Velocity Profile Generator 15 solves an equation of motion based on a constant deceleration shown below.

$$v^2 - v_o^2 = 2a(d-d_o) \quad (1)$$

$v_o$ = the initial velocity
$v$ = the final velocity
$d_o$ = the initial distance
$d$ = the final distance
$a$ = the rate of acceleration Since the final velocity and final distance equals zero (when the tanker is docked) and it is desired to determine the instantaneous desired profile velocity, the equation (1) reduces to equation (2) shown below.

$$v_p = \sqrt{2ad}$$

Where
$v_p$ = the desired profile velocity at distance $d$.
$d$ = the tanker to dock distance at that time.
$a$ = the deceleration rate The Velocity Profile Generator 15 shown in the block diagram of FIGS. 5A–5B is an analog computer. For this reason the digital distance to the dock count which is stored in the Radar Distance to Dock Counter 36 must be converted to its voltage analog equivalent. This is done in the D to A Distance Converter 42 which consists of an analog summer 43 with a binary weighted resistor ladder 44 connected to the Distance Counter 36. In the next analog stage the analog distance is multiplied by "$2a$" by means of a variable input resistor 45 and amplifier 46, which is calibrated in values of "$a$" and is input to the next stage 47. This final analog computing stage 47 is a square rooting stage which contains a square root function element 47A in its feedback path. The output of this stage produces a voltage analog of "$1.2v_p$". As the tanker moves parallel into the dock, its distance to the dock is gradually reduced in the Radar Dock to Distance Counter 36 by the received radar frequency signal counting down this distance counter. The Velocity Profile Generator 15 is continuously operating on this distance information and generating the desired current velocity, $v_p$, which corresponds to the current distance.

The profile velocity, $v_p$, is continuously compared with the actual tanker velocity, $v_t$, from tanker velocity computer 13 in the four Velocity Comparators 16–19. These comparators operate respective relays 20–23 which in turn control the five aspects of the Signal Head 24. All comparator relays "down" provide a steady RED aspect indicating the tanker velocity is too high. The phasing of the Velocity Comparators 16–29 is such that whenever the tanker velocity $v_t$ is greater than the profile velocity, $v_p$, input, the comparator deenergizes its output relay. This is in keeping with fail safe concepts where all control relays "down" will generate the most restrictive signal aspect RED. Notice that the four Velocity Comparators 16–19 each have a different adjustable percentage of profile velocity $v_p$ input resistors 50–53 so they can generate different level points around the profile velocity $v_p$. If the preset tanker deceleration rate is 4 feet per minute per minute, the 1.12 $v_p$ input of comparator 16 approximates a profile velocity set point representing a deceleration rate of 5 feet per minute per minute. The 0.87 $v_p$ input of comparator 19 approximates a profile velocity set point representing a deceleration rate of 3 feet per minute per minute. The pilot on the tanker bridge can see the Signal Head 24 mounted on the dock and uses his walkie-talkie to communicate with the tugs which are pushing the tanker in broadside to the dock. If the pilot sees the signal head aspect is RED, i.e., $v_t$ greater than 1.12$v_p$, he will have the tug boats slack off. As the tanker velocity reduces below 1.12 $v_p$, relay 20 will operate and change the signal aspect to a FLASHING RED, indicating the tanker velocity is still too high but is is approaching the correct berthing velocity. If the tanker velocity continues to decrease and becomes less than 1.04 $v_p$, relay 21 will operate which will change the signal aspect to GREEN, indicating the tanker is moving at the desired berthing velocity. If the tanker should continue to further decrease its velocity to less than 0.96 $v_p$, relay 22 will operate changing the signal aspect to a FLASHING YELLOW, indicating to the pilot that the tanker velocity, $v_t$, is slightly below the desired velocity. Should the tanker velocity continue to decrease below 0.87 $v_p$, relay 23 will operate and the signal head will display a steady YELLOW aspect, indicating to the pilot that the tanker is too slow at that time.

The Start-Stop Flip-Flop 33 operates the NOT-STOP relay 54 which turns "on" the Signal Head 24. Therefore before the tanker starts its berthing operation and the Start-Stop Flip-Flop 33 has not yet been set, the NOT-STOP relay 54 will be down, thus removing the energy to the Signal Head 24. This indicates to the pilot that the berthing control system has not yet "locked on" to the tanker. Once the tanker starts its berthing procedure, the radar unit 10 will receive a solid velocity signal in the frequency range of 5 to 25 Hz. If this signal continues for 10 seconds, the Start-Stop Flip-Flop 33 will be set which will reset the Delayed Stop Flip-Flop 34 which in turn will preset the Radar Distance to Dock Counter 36 to a nominal preset distance (250 feet). At the same time, the Start-Stop Flip-Flop 33 will operate the NOT-STOP relay which will now cause the Signal Head 64 to display one of its five aspects, indicating to the pilot that the berthing control system recognized the start of a berthing operation and is ready to provide him with control information. If during the berthing procedure the Radar Unit should fail or if the tanker comes to a complete stop, the 10 Second "OFF" Delay circuit 55 will reset the Start-Stop Flip-Flop 33 which in turn will drop the NOT-STOP relay 54 turning off the Signal Head 24 energy. This indicates to the pilot that the control system is not operative or temporarily cannot provide him with correct control information. Notice that the resetting of the Start-Stop Flip-Flop 33 closes the Count AND Gate 39 to the Radar Distance Counter 36 so that noise pulses cannot disturb the last known distance setting, but it does not set the Delay Stop Flip-Flop 34. If the tanker had only stopped for a short time less than 5 minutes, the Delayed Start-Stop Flip-Flop 34 will remain set when the tanker again starts moving because delay circuit 56 holds off a set signal with the Signal Head 24 lighting and the Count AND Gate 39 being opened to the Radar Distance Counter 36. Note that the Radar Distance Counter 36 is not preset again to 250 feet but continues to down count from its last known distance, because the Delayed Stop Flip-Flop 34 never cycled during this temporary stop. It is felt that the five signal aspects plus its "ON" or "OFF" state will provide the pilot with all the correction information he needs to safely berth a tanker and also provide him with information as to the operation condition of the control system itself.

At the beginning of the berthing control cycle, a preset nominal distance to the dock (250 feet in this example) must be set into the Radar Distance Counter 36. The reason for this is that a doppler radar sensor is used which is only sensitive to target velocity and movement and not to absolute distance measurement. Therefore in actual operation, the tanker might start berthing at a distance less or greater than the preset 250 feet which will result in small error in the computed profile velocity $v_p$. The error in the computed profile velocity can cause damage to the dock and tanker if the tanker started berthing closer than the preset 250 feet from the dock because the error in the profile velocity is in the too high direction. To correct for this error in the tanker to dock distance, a sonic distance ranging sensor 25 is incorporated in the system. Since the sonic detector 11 can only operate out to a maximum distance of 100 to 140 feet, it can not be used to measure the initial starting distance to the dock and a preset nominal distance will have to be used. The sonic ranging detector 25 is basically an ultrasonic detector operating at a slow repetition rate of 1 cps because of the long ranging distance. Everytime a transmitted pulse is initiated, it sets the Count Gate Flip-Flop 60 shown on the block diagram of FIG. 5. It also triggers a Count Overrun Reset Single Shot 61 which runs for 0.8 second. If the range is so long (greater than 140 feet) that a return echo is not received, the Count Gate Flip-Flop 60 is not reset. Once the tanker comes in range of the Sonic Sensor 11, the Count Gate Flip-Flop 60 is reset each time an echo is received. During the time the Count Gate Flip-Flop 60 is set, it opens a sonic Count Gate 62 which permits the Sonic Distance Counter 63 to count up pulses from the Clock Oscillator 64. The magnitude of the count in the Sonic Distance Counter 63 at the time when the Count Gate Flip-Flop 60 is reset, is proportional to the distance of the tanker to the dock. The time period that the Count Gate 63 is open represents the round trip travel time of an ultrasonic pulse being transmitted from the sonic transducer, reflected from the tanker and again being received. Since the velocity of sound in air is dependent on the air temperature, the differences in velocities of propagation can be compensated by varying the Clock Oscillator 64 frequency in accordance with the ambient air temperature. Since it is desired to correct the Radar Distance Counter 36 with the Sonic Distance Counter 63, it is necessary that the distance scale in both counters be equal. That is that a count in each counter represents the same amount of distance. Earlier in this disclosure it was stated that each cycle of output from the radar unit represents a movement of 0.04675 feet by the tanker. Each count in the Radar Distance Counter 63 represents 0.4675 feet because the radar output pulses are divided by 10 in the decade divider 65 before being entered into the Radar Distance Counter 36. Therefore each count in the Sonic Distance Counter 63 will also have to represent 0.4675 feet. From this we can determine the frequency of the Clock Oscillator 64 at any ambient air temperature. The velocity of sound through air varies as shown in equation (3).

$$V_s = 1,052.03 + 1.106\, T_F \text{ ft. per sec.} \tag{3}$$

where $T_F = °F$

Assuming an ambient of 45°F, then $v_s = 1,102$ ft. per sec. Since each 0.4675 ft. distance between the tanker and the dock requires a round trip by the ultrasonic pulse, it means that the distance traveled by the sound pulse for each count in the counter is 2 × 0.4675 or 0.9350 ft.

The time period of one cycle of the Clock Oscillator 64 at 45°F then is equal to:

Tp = 0.935/1,102 = 0.000836 seconds

Clock Freq. = 1/0.000836 = 1,196 cycles per sec.

Or the required Clock Oscillator 64 frequency can be determined by equation (4) shown below:

$$\text{Freq.} = V_s/0.935 = 1,052.03 + 1.106 I_F/0.935 \tag{4}$$

The Sonic Distance Counter 63 operates once each second. When the Sonic Detector 25 initiates a transmit pulse, it sets the Count Gate Flip-Flop 60 and triggers the Count Overrun Reset Single Shot 61 which both in turn open the Sonic Count Gate 62. The Sonic Distance Counter 63 not starts counting the pulse output of the Clock Oscillator 64. When the echo pulse is received by the Sonic Detector 25 (approximately two times the distance to the tanker in feet, milliseconds later) the Count Gate Flip-Flop 60 is reset thus closing the Sonic Count Gate 62 and holding the distance count in the Sonic Distance Counter 63. This count represents the distance from dock to the tanker (each count represents 0.4675 feet). The Count Overrun Reset Single Shot 61 terminates 0.8 seconds from the transmit pulse time and triggers the Counter Clear single shot 66 which now resets the Sonic Distance Counter 63 to zero after which time the Sonic Detector 25 again generates a transmit pulse and the cycle is repeated. Between the time the Sonic Count Gate 62 closes and the Counter Clear Single Shot 66 resets the Sonic Distance Counter, this count may be transferred into the Radar Distance Counter 36 to correct this counter to the correct dock to tanker distance. This transfer only takes place if the Sonic Signal Validity Check Computer 28 considers the sonic distance count correct and triggers the Sonic Distance Transfer Control 27.

It is possible that an occasional false echo may be received by the Sonic Detector. This false echo would result in a false distance count which if it were transferred into the Radar Distance Counter 36 could result in erroneous control signals being displayed by the Signal Head 24. To discriminate against occasional false sonic echos, the Sonic Signal Validity Check Computer 28 is utilized.

The Sonic Signal Validity Check Computer 28 generates an analog sonic distance measurement by integrating the time interval that the Count Gate Flip-Flop 60 is in its "set" state on an operational amplifier integrator 67. At the end of 0.8 of a second this integrator 67 is reset by the reset of the Count Overrun Reset Single Shot 61. It was decided that in this application of the Sonic Detector 25, a valid return echos had to be received within 0.45 seconds from the time a transmit pulse was generated. If a return echo was not received by this time, a count overrun condition exists and any sonic distance measurement must be invalidated. The count overrun condition is detected by the Overrun Check Single Shot 68 and the Overrun Flip-Flop 69. When the Sonic Detector 25 generates a transmit pulse, it sets the Count Gate Flip-Flop 60. This Flip-Flop 60 in turn triggers the Overrun Check Single Shot 68 which removes one of the inputs to AND gate 70 which sets the Overrun Flip-Flop 69. After 0.45 seconds, the Overrun Check Single Shot 68 resets itself, restoring one of the inputs to the above-mentioned AND gate 70. If the Count Gate Flip-Flop 60 has not been reset by this time, the other input to the AND gate 70 exists and the Overrun Flip-Flop 69 is set, storing the fact that an overrun condition had existed during that count cycle. Note that the Overrun Flip-Flop 69 is reset when the next transmit pulse is generated by the Sonic Detector 25.

As described earlier, when the berthing operation first starts, the tanker is about 250 feet from the dock which is beyond the range capability of the Sonic Detector 25. At about 140 foot range, the Sonic Detector 25 begins to pick up reflected echos from the tanker. This function is detected by the Sonic Range Flip-Flop 71. This Flip-Flop 71 is set by an AND gate 72 whose inputs are the "on" period of the Overrun Check Single Shot 68 and the "off" side of the Count Gate Flip-Flop 60. In other words, the first time the Count Gate Flip-Flop 60 is reset before the Overrun Check Single Shot 68 has run out its 0.45 second timing period, the Sonic Range Flip-Flop 71 is set. This Flip-Flop 71 is not reset until the Delayed Stop Flip-Flop 34 is set, so that once sonic range is acquired on the tanker, the Sonic Range Flip-Flop 71 is set and is not reset until 5 minutes after the berthing of the tanker is completed.

The just described logic elements are the control logic elements of the Sonic Signal Validity Check Computer 28 section. As mentioned earlier, a voltage analog of the tanker to dock distance is generated each transmit-receive cycle of the Sonic Detector 25 in the analog Distance Integrator 67. 0.8 of a second after the transmitted pulse, this integrator 67 is reset to zero when the Count Overrun Reset Single Shot 61 restores. Following this integrator is an analog Averaging and Hold Circuit 73. This Averaging and Hold Circuit 73 is held at zero until the first returned echo is obtained from the tanker. This condition is recognized by the setting of the Sonic Range Flip-Flop 71 which in turn "turns off" the shorting switch FET-3 across the averaging and storage capacitor 76. The Average and Hold Circuit 73 is normally disconnected from the Distance Integrator 67 by a switch FET-2 which is normally held open. This switch is controlled through an AND gate 74 whose inputs are the "off" Overrun Flip-Flop 69 output and the Sample Single Shot 75.

This part of the Sonic Signal Validity Check Computer 28 operates in the following manner. At the instant that the Sonic Detector 25 generates a transmit pulse, the Count Overrun Reset Single Shot 61 is triggered which in turn opens the reset switch FET-1 across the integrating Capacitor 77 and the Distance Integrator 67 begins to integrate the time period generated by the Count Gate Flip-Flop 60. If the range is so great, that a return echo is too weak to be received, the Distance Integrator 67 continues to integrate since the Count Gate Flip-Flop 60 is not reset. Finally when the 0.8 second time period generated by the Count Overrun Reset Flip-Flop 61 is completed, it turns on the switch FET-1 which resets the integrator to zero, ready for the next transmit pulse. Because the range is still too great, the Overrun Flip-Flop 69 had been set and the Sonic Range Flip-Flop 71 is still in its reset state. Because of this, the averaging and hold capacitor 76 is still being held at Zero by the shorting switch FET-3 and the input of the Average and Hold Circuit 73 is still disconnected from the Distance Integrator 67 by the open switch FET-2. The circuit continues to function in this manner until the tanker has approached the dock close enough that an echo is received by the Sonic Detector 25 (about 100–140 feet tanker to dock distance). When an echo is received less than 0.45 second after the transmit pulse, the Sonic Range Flip-Flop 71 is set and the Overrun Flip-Flop 69 does not become set. During this cycle, the Distance Integrator 67 stops integrating when the Count Gate Flip-Flop 60 is reset because it removes the input from the integrator. This stopped voltage level at the output of the integrator is a direct voltage analog of the distance to the tanker. At the instant that the Count Gate Flip-Flop 60 is reset, the Sample Single Shot 75 is triggered which in turn closes FET-2 for 0.1 second, connecting the output of the Distance Integrator 67 to the Average and Hold Circuit 73. At the time the Sonic Range Flip-Flop 71 was set, it "turned off" the reset switch FET-3 so now the Average and Hold Circuit 73 begins to charge up to the distance value that is held on the Distance Integrator 67. The "gate time" that switch FET-2 is closed (0.1 sec.) is correlated with the time constant of the averager 73 so that only a tenth of the value of the instantaneous distance analog at the output of the integrator 67 is charged up on the Average and Hold Circuit 73 during any one cycle of the Sonic Detector 25. This means that it takes about 10 samplings before the voltage analog of the Average and Hold Circuit 73 would equal the voltage analog of the Distance Integrator 67. In this way, the occasional false echos have a very minor effect on the averaged distance analog that exists at the output of the Average and Hold Circuit.

Once the FET-2 switch opens again, at the end of the 0.1 second period of the Sample Single Shot 75, the Average and Hold Circuit 73 is in its "hold" mode and it will hold the distance analog voltage until the next sampling period when it again will be modified by 10 percent of the value of the instantaneous distance analog. Since the tanker is constantly moving into the dock, each cycle operation of the Sonic Detector 25 will result in a small change in the instantaneous distance analog which will in turn equally modify the average distance analog. If no false echos are received, the averaged distance analog will equal the instantaneous distance analog (except for sign) within a few milliseconds after the sample switch FET-2 is closed after at least ten valid samplings. Once this equilibrim state has been reached, the averaged distance analog reading can be used as a running reference to check each instantaneous distance values to determine if it is the result of a true received sonic echo from the tanker.

Note when a false echo is received, the instantaneous distance analog will differ sufficiently from the averaged distance analog so as to indicate that that particular instantaneous distance measurement is in error and should not be used to correct the Radar Distance Counter 36. The comparing of these two distance analogs is done on two Sonic Distance Comparators 78 and 79. Comparator 78 checks that the instantaneous distance is greater than 0.95 times the averaged distance analog while Comparator 79 checks to see that it is less than 1.05 times the averaged distance analog. A simultaneous output from both Comparators 78 and 79 would indicate that the instantaneous distance analog is within ±5 percent of the averaged distance analog and is therefore probably a valid distance measurement during that cycle of the Sonic Detector 35 operation. Since the distance count in the Sonic Distance Counter 63 is an exact digital equivalent of the instantaneous distance analog during any one cycle, simultaneous outputs from the Sonic Distance Comparators 78 and 79 would indicate that the count in the Sonic Distance Counter 63 was a valid distance and it could be used to correct the Radar Distance to Dock Counter 36. Therefore the outputs from the Sonic Distance Comparators 78 and 79 plus the "Not" outputs from the Count Gate Flip-Flop 60 and Overrun Flip-Flop 69 are inputs to the Valid Sonic Distance Check AND gate 80. The output of this AND gate 80 initiates a clearing of the Radar Distance Counter 36 and triggers the Transfer Command Gate 81 which sets the present Sonic Distance Counter 63 count into the Radar Distance Counter 36 thereby updating it to the correct tanker to dock distance.

The clearing and setting of the Radar Distance Counter 36 is accomplished in the Sonic Distance Transfer Control 27 in the following manner. When the Count Gate Flip-Flop 60 is reset by the return echo, it triggers a 0.2 second Set Initiate Single Shot 82. The output of this single shot is AND'd in Sonic Transfer AND Gate 83 with the output of the Delayed Stop Flip-Flop 34 and the output of the Valid Sonic Distance Check AND gate 80. The output of this AND gate 83 goes through an OR gate 84 and triggers the Counter Clear Single Shot 85 which clears the Radar Distance Counter 36. When the Counter Clear Single Shot 85 has terminated its period, it triggers the Counter Set Single Shot 86. The output of the Counter Set Single Shot 86 is one input to the Transfer Command Gate 81 together with the output of the Valid Sonic Distance Check AND Gate 80 and the Set Initiate Single Shot 82. The output of the Transfer Command Gate 81 triggers the Sonic Distance Transfer Gates 87 which now transfer the instantaneous distance count in the Sonic Distance Counter 63 into the Radar Distance Counter through OR gates 88.

A typical berthing operation of a tanker is simulated on the logic sequence chart shown in FIG. 6. Assume the tanker is being moved into position longitudinally along the dock but about 300 feet out from the dock. During this period only sporadic high frequency "noise" bursts (above 25 Hz) are output from the Radar Unit 10 since the longitudinally moving tanker presents relatively little motion toward the Radar Unit 10. During this period the control system is in its non operate condition with the Signal Head 24 "off". Once the tanker is correctly aligned longitudinally with the dock, the pilot will call the tug boats to start berthing the tanker broadside into the dock. For this example, let it be assumed that the tanker is about 300 feet from the dock instead of the nominal 250 feet from the dock. When the berthing operation starts, a strong output signal in the frequency range of 5-25 Hz is received from the Radar Unit 10 because the motion of the tanker is now directly toward the Radar Unit 10. Ten seconds after the start of this signal from the Radar Unit 10 the Start-Stop Flip-Flop 33 is set which in turn resets the Delayed Stop Flip-Flop 34. This operation initiates a clear and preset operation of the Radar Distance Counter 36 to a count of 535 which represents a preset distance of 250 feet on switches 38. The tanker is actually about 300 feet from the dock. With the distance in the Radar Distance Counter 36 set to the equivalent of 250 feet, the Velocity Profile Generator 15 will generate an initial profile velocity, $v_p$, of 44.75 feet per minute. Setting of the Start-Stop Flip-Flop 33 also turned "on" the Signal Head 24 which from the sequence chart would indicate a RED aspect because the tanker berthing velocity was greater than 1.12 times $v_p$. Note that the Radar Distance Counter 36 is being down counted by the frequency output of the Radar Unit 10, thereby reducing the computed radar distance which in turn results in a reducing computed profile velocity $v_p$. Let it now be assumed that the pilot advised the tug boat to cease pushing in the tanker and the tanker velocity is allowed to drop to zero. Notice as the tanker velocity, $v_t$, passes through the profile velocity, $v_p$, the Signal Head 24 aspect changes from RED to FLASHING RED to GREEN to FLASHING YELLOW to YELLOW. When the tanker has come to a standstill, no output is developed by the Radar Unit 10. After 10 seconds the delay circuit resets the Start-Stop Flip-Flop 33 which in turn turns "off" the Radar Count Gate 39 and the Signal Head 24, indicating to the pilot that the tanker has come to a standstill. (or it could mean that the Radar Unit 10 has failed) During this same time, the 5 minute delay circuit 56 is activated. If the berthing operation is initiated again before a 5 minute period has elapsed, the 5 minute delay circuit 56 is immediately reset. As soon as an output below 25 Hz is sensed out of the Radar Unit 10, a 10 second delay turn "on" 32 is initiated which at the end of its period sets the Start-Stop Flip-Flop 33 again. Again the Radar Count Gate 39 is opened and the Signal Head 24 is illuminated, indicating to the pilot that the system has again "locked on" to the tanker movement. These operations are illustrated on the sequence chart shown on FIG. 6. Note that the Radar Distance Counter 36 held the distance count during the period the tanker was temporarily standing still. All during this time the Sonic Detector 25 has been operating, but because of the great range (greater than 140 feet) no echo has been received from the Sonic Detector 25 with the result that the Sonic Distance Counter 63 has been running into an overcount condition. At about a range of 127 feet, the Sonic Detector detects the first echo. This detected echo turns "off" the Sonic Count Gate 62 stopping the Sonic Distance Counter 63 at a count of 312 (127 feet). This also stopped the Instantaneous Distance Integrator 67 at a voltage analog equivalent to 127 feet, set the Sonic Range Flip-Flop 71 and triggered the Sample Single Shot 75. The setting of the Sonic Range Flip-Flop 71 releases the distance averaging and hold capacitor by opening switch FET-3. Since during this cycle of operation of the Sonic Detector 25, the Overrun Flip-Flop 69 was not set, the output of the Sample Single Shot 75 closes switch FET-2 for 0.1 second. During this time, the Averaging and Hold Amplifier 73 charges up to about 10 percent of the instantaneous distance voltage analog held on the Distance Integrator 67. Notice that the Sonic Distance Counter 63 during this cycle stopped at a count of 312 while the Radar Distance Counter 36 has counted down to about 230. This difference in count represents a difference in distance of about 50 feet which reflects the fact that the tanker started its berthing operation at 300 feet, while the Radar Distance Counter 36 was preset to a nominal 250 feet distance. During this cycle, the Radar Distance Counter 36 was not corrected to the Sonic Distance Counter 63 because the averaged sonic distance voltage analog was less than 95 percent of the instantaneous sonic distance. During the next cycle of operation of the Sonic Detector 25, an echo was not received resulting in the Overrun Flip-Flop 69 being set. Because of this reason, the Averaging and Hold Amplifier 73 does not sample the Distance Integrating Amplifier 67. On following Sonic Detector 25 cycles, an echo is received. Note that the Sonic Distance Counter 63 counts up to a lower count each cycle, representing a continual reduction in distance due to the movement of the tanker toward the dock. Each of these cycles transfers an additional 10 percent of the instantaneous distance to the average distance held by the Average and Hold Amplifier 73. Notice that after the nineth cycle when an echo was received, the instantaneous distance voltage analog is greater than 95 percent but less than 105 percent of the average distance voltage analog. This condition results in an output from the Valid Sonic Distance AND Gate 80 which in turn triggers the Counter Clear Single Shot 85, clearing the Radar Distance Counter 36 to zero. Following the clearing operation, the Counter Set Single Shot 86 is triggered which now opens the Sonic Distance Transfer Gate 81 and the count that is in the Sonic Distance Counter 63 is duplicated in the Radar Distance Counter 36. This correction of the Radar Distance Counter 36 eliminated the running error of this counter that resulted from the 50 foot difference of the actual starting of the tanker berthing operation (300 ft.) and the nominal 250 foot preset value set into the Radar Distance Counter 36 at the start of the berthing operation. Because of this substantial change in the Radar Distance Counter 36, a corresponding step change will occur in the Profile Velocity $v_p$. Because in the berthing example shown in FIG. 6, the tanker velocity $v_t$ was almost equal to the profile velocity $v_p$ just before the distance correction, the Signal Head 24 will suddenly display a YELLOW aspect indicating that the tanker velocity is too slow, so the pilot now has to realign the tanker berthing velocity back to the new revised profile velocity. Notice that during a later cycle an echo is not received by the Sonic Detector 25 and the Overrun Flip-Flop 69 is set, the average distance voltage analog is not modified and the Radar Distance Counter 36 is not cleared and corrected. Since the radar cycles that are output from the Radar Unit 10 continuously down count the Radar Distance Counter 36, the two distance counters will generally have identical counts in them prior to any counter correction operation once the major correction has been made for the actual start of berthing distance. Therefore the Sonic Detector 25 information would generally not be needed after the major distance correction unless the tanker should stop or possibly drift away from the dock momentarily since the Radar Unit cannot differentiate between an approaching or receding target.

FIG. 6 illustrates two instances of false echo receptions, the first being an echo received too soon and the second being an echo received too late. Note that in each case, the average distance voltage analog was modified but since the instantaneous distance analog did not fall within ±5 percent of the average distance voltage analog, a counter correction cycle was not initiated so that the Radar Distance Counter 36 was never reset to a false distance. Once true ranging echos were again received and the instantaneous distance voltage analog was within ±5 percent of the average distance voltage analog, counter correction cycles again resumed. Since in practice false ranging echos occur less than 10 percent of the time, this correction control system would work quite well.

A minimum profile velocity is generated by the Velocity Profile Generator 15 which is the maximum safe dock touching velocity for the largest expected tanker. This decreases the berthing time for the last few feet to the dock than if the profile were allowed to go to zero. It also precludes the chance of slight errors in distance to call for a zero profile velocity before the tanker actually touched the dock. Notice in FIG. 6 that once the tanker has come to rest against the dock, the output of the Radar Unit 10 terminates. Ten seconds later the Start-Stop Flip-Flop 33 is reset. At this same time the 5 minute Delayed Stop 56 is running. After the 5 minute period has expired without further signal output from the Radar Unit 10, the Delayed Stop Flip-Flop 34 is set which in turn resets the Sonic Range Flip-Flop 71 thus the Berthing Control System is reset awaiting another tanker berthing operation.

Many of the new tankers have built-in horizontal thrusters (not shown) and it is contemplated that this control system could directly control these thrusters for providing completely automatic docking of tankers without human assistance by using the output relays 20–23 to control automatically side thruster parameters. Also the system could be reversed with the equipment and sensors on the ship, thus eliminating the requirement to communicate between shore and ship. This would permit automatic docking of such equipped ships on any unequipped dock.

While there has been described what is at present considered to be the preferred embodiment of the invention, it will be obvious to those skilled in the art that various changes and modifications may be made therein, without departing from the invention.

What is claimed is:

1. A system for providing correction command signals relative to the berthing velocity profile of a vehicle in approach of a docking position comprising:
   a. a doppler radar system including a radar transceiver for projecting signals between the docking position and the vehicle and respondingly generating doppler shift frequency signals indicative of the velocity of the vehicle and the relative displacement thereof;
   b. a radar counter having initial counts stored therein indicative of anticipated initial berthing conditions responsive to the frequency shift signals for counting down said initial counts in accordance with the doppler shift;
   c. means for updating the radar counter in accordance with actual initial conditions including, a sonic detector for periodically projecting sonic signals between the vehicle and the docking position and respondingly generating a corrected count signal in accordance with reflected sonic energy, indicative of the actual distance of the vehicle to the docking position; and
   d. means for transferring periodically said corrected count signals to the radar counter for correcting the initial conditions.

2. The system according to claim 1 further including: a velocity profile generator responsive to the radar counter output for generating a programmed desired berthing velocity profile; and a comparator responsive to the velocity profile generator and the counter for generating command signals indicative of any discrepancy between the actual vehicle berthing profile and the programmed desired berthing velocity profile.

3. The system according to claim 2 further including: a velocity computer responsive to the radar counter output for providing an analog signal to the comparator indicative of velocity.

4. The system according to claim 1 further including:
   a. start-up means coupled to the transceiver responsive to doppler signals of a selected range of frequencies for initiating a start signal for the system;
   b. delayed stop means for initiating a stop signal for the system after a cessation of the start signals for a minimum time; and
   c. means for providing the initial counts to the counter storage responsive to the start signal.

5. A system according to claim 1 wherein said means for updating the counter further includes:
   a. a generator for producing counts at a frequency corresponding to the vehicle speed and distance from the dock;
   b. a count gate, set, and reset in response to the periodically transmitted and reflected sonic energy of the sonic detector, for gating those counts produced over the time between the set and reset state of the count gate; and c. a sonic counter responsive to the generator for storing the counts indicative of vehicle speed and actual vehicle distance from the dock.

6. The system according to claim 4 further including: sonic check means responsive to the count gate for checking the validity of the sonic vehicle speed and distance counts, and wherein the transferring means is responsive to the sonic check means and the count gate for transferring the stored counts from the sonic counter to update the radar counter.

7. The system according to claim 6 wherein said sonic check means further comprises: a two stage velocity computer including; an instantaneous velocity detector responding to the sonic counter for producing an instantaneous analog output of indication of velocity, said instantaneous detector gated within selected intervals indicative of anticipated instantaneous velocity, a velocity averager periodically gated to respond to the output of the instantaneous detector for producing an average velocity signal within selected intervals of anticipated vehicle range; and comparator means responsive to the instantaneous analog signal and the average velocity signal for producing an output indication of valid counts of said sonic counter.

8. The system according to claim 7 wherein said instantaneous velocity detector and said velocity averager each include a field effect transistor controlling the respective outputs thereof, each field effect transistor respectively controlled by the sonic detector and the sonic check means, and further the averager includes a field effect transistor controlling the input thereof in accordance with the sonic check means.

* * * * *